(12) United States Patent
Klaußner et al.

(10) Patent No.: US 11,426,941 B2
(45) Date of Patent: Aug. 30, 2022

(54) METHOD FOR CALIBRATING AT LEAST ONE APPARATUS FOR ADDITIVELY MANUFACTURING THREE-DIMENSIONAL OBJECTS

(71) Applicant: CONCEPT LASER GMBH, Lichtenfels (DE)

(72) Inventors: Tim Klaußner, Kronach (DE); Tobias Bokkes, Untersiemau (DE); Martin Wachter, Weißenbrunn (DE); Fabian Zeulner, Lichtenfels (DE); Marie-Christin Ebert, Coburg (DE)

(73) Assignee: CONCEPT LASER GMBH, Lichtenfels (DE)

( * ) Notice: Subject to any disclaimer, the term of this patent is extended or adjusted under 35 U.S.C. 154(b) by 104 days.

(21) Appl. No.: 16/254,517

(22) Filed: Jan. 22, 2019

(65) Prior Publication Data

US 2019/0248075 A1    Aug. 15, 2019

(30) Foreign Application Priority Data

Feb. 9, 2018 (EP) ..................... 18156128

(51) Int. Cl.
*B29C 64/393* (2017.01)
*B33Y 50/02* (2015.01)
(Continued)

(52) U.S. Cl.
CPC ............ *B29C 64/393* (2017.08); *B22F 10/20* (2021.01); *B29C 64/135* (2017.08); (Continued)

(58) Field of Classification Search
CPC ........................... B29C 64/264–282
See application file for complete search history.

(56) References Cited

U.S. PATENT DOCUMENTS 6,930,278 B1    8/2005 Chung et al.
2016/0146671 A1    5/2016 Schwarze et al.
(Continued)

FOREIGN PATENT DOCUMENTS

CN    201470297 U    5/2010
CN    103071796 A    5/2013
(Continued)

OTHER PUBLICATIONS

European Search Report Corresponding to Application No. 18156128 dated Aug. 13, 2018.
(Continued)

*Primary Examiner* — Niki Bakhtiari
*Assistant Examiner* — John J DeRusso
(74) *Attorney, Agent, or Firm* — Dority & Manning, P.A.

(57) ABSTRACT

Method for calibrating at least one apparatus (1) for additively manufacturing three-dimensional objects by means of successive layerwise selective irradiation and consolidation of layers of a build material which can be consolidated by means of an energy beam that can be generated via an irradiation element of an irradiation device (7) of the apparatus (1), wherein a determination unit (2) is provided for determining at least one parameter of radiation (3) inside a process chamber (5), wherein a calibration beam source (4) is arranged or generated inside the process chamber (5) of the apparatus (1), in particular in a build plane (9) or a region above the build plane (9), wherein at least one parameter, in particular the intensity, of radiation (3) emitted by the calibration beam source (4) is determined via the determination unit (2).

13 Claims, 1 Drawing Sheet

Figure 1:
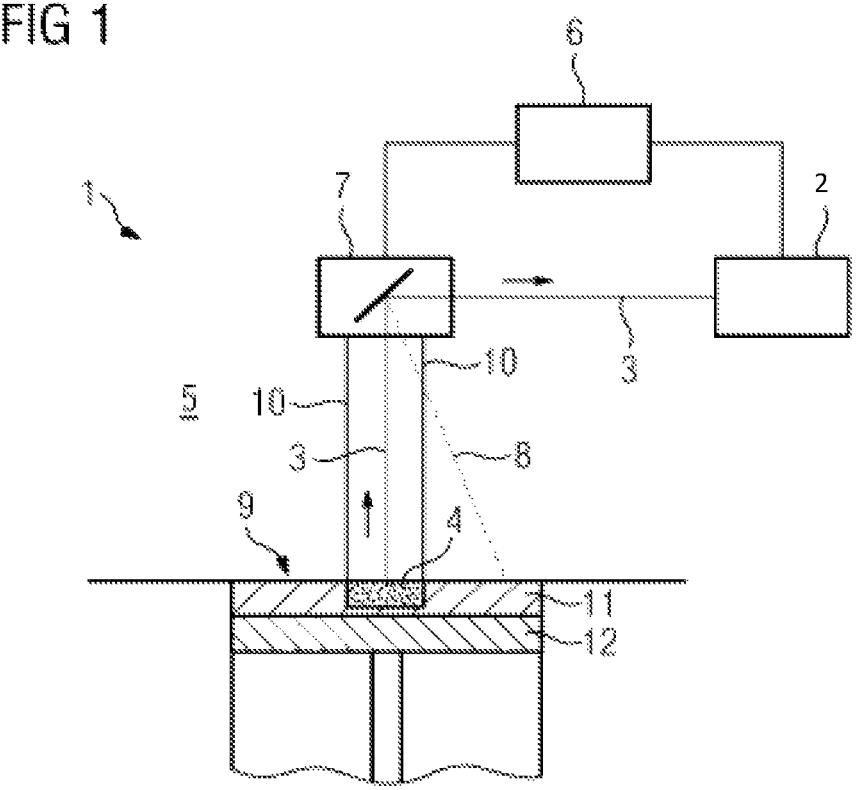

(51) Int. Cl.
  *B29C 64/277* (2017.01)
  *B29C 64/268* (2017.01)
  *B22F 10/30* (2021.01)
  *B33Y 30/00* (2015.01)
  *B29C 64/153* (2017.01)
  *B22F 10/20* (2021.01)
  *B29C 64/135* (2017.01)
  *B29C 64/165* (2017.01)
  *G06F 30/00* (2020.01)
  *B33Y 10/00* (2015.01)
  *G06F 119/18* (2020.01)

(52) U.S. Cl.
  CPC .......... *B29C 64/153* (2017.08); *B29C 64/165* (2017.08); *B29C 64/268* (2017.08); *B29C 64/277* (2017.08); *B33Y 30/00* (2014.12); *B33Y 50/02* (2014.12); *G06F 30/00* (2020.01); *B22F 10/30* (2021.01); *B33Y 10/00* (2014.12); *G06F 2119/18* (2020.01)

(56) References Cited

U.S. PATENT DOCUMENTS

| | | | |
|---|---|---|---|
| 2017/0104983 | A1 | 4/2017 | Lee et al. |
| 2017/0242424 | A1 | 8/2017 | Spears |
| 2017/0274592 | A1 | 9/2017 | Herzog et al. |
| 2017/0294288 | A1 | 10/2017 | Lock |
| 2020/0023585 | A1* | 1/2020 | Wiesner ............... B23K 26/342 |
| 2020/0290285 | A1* | 9/2020 | Werner ................. B33Y 40/00 |

FOREIGN PATENT DOCUMENTS

| | | | |
|---|---|---|---|
| CN | 205362673 | U | 7/2016 |
| CN | 106976231 | A | 7/2017 |
| DE | 102013201629 | A1 | 7/2014 |
| DE | 102014012286 | A1 | 2/2016 |
| EP | 1634694 | A2 | 3/2006 |
| EP | 2572865 | A1 | 3/2013 |
| EP | 3023757 | A1 | 5/2016 |
| EP | 3241668 | A1 | 11/2017 |
| JP | 2013/067016 | A | 4/2013 |
| JP | 2016/102784 | A | 6/2016 |
| JP | 2017/1444484 | A | 8/2017 |
| JP | 2017/532203 | A | 11/2017 |
| WO | WO2016/026664 | A1 | 2/2016 |
| WO | WO2017/137022 | A1 | 8/2017 |

OTHER PUBLICATIONS

European Search Opinion Corresponding to Application No. 18156128 dated Aug. 27, 2018.
Machine Translated Japanese Office Action Corresponding to Application No. 2018169494 dated Aug. 22, 2019.
Combined Chinese Search Report and Office Action Corresponding to Application No. 201810233594 dated Sep. 9, 2020.
European Search Report Corresponding to Application No. 20159993 dated Jul. 17, 2020.
European Office Action Corresponding to Application No. 17172837 dated Jul. 24, 2020.
Chinese Office Action Corresponding to Application No. 201710637468 dated Sep. 10, 2020.

* cited by examiner

METHOD FOR CALIBRATING AT LEAST ONE APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 156 128.3 filed Feb. 9, 2018, the contents of which is incorporated herein by reference in its entirety as if set forth verbatim.

The invention relates to a method for calibrating at least one apparatus for additively manufacturing of three-dimensional objects by means of successive layerwise selective irradiation and consolidation of layers of a build material which can be consolidated by means of an energy beam that can be generated via an irradiation element of an irradiation device of the apparatus, wherein a determination unit is provided for determining at least one parameter of radiation inside the process chamber.

Apparatuses for additively manufacturing three-dimensional objects in which an energy beam is used to selectively irradiate and thereby consolidate a (powdery) build material in a process chamber of the apparatus are generally known from prior art. Such apparatuses typically comprise irradiation devices with at least one irradiation element via which the energy beam can be emitted inside the process chamber to irradiate the build material, e.g. arranged in a build plane. To ensure that the energy beam is properly guided onto the build plane it is further known to provide a determination unit that is adapted to determine at least one parameter of radiation inside the process chamber, usually a parameter of the energy beam.

Hence, the determination unit can be used to determine whether the at least one parameter of the energy beam that is generated and guided inside the process chamber meets defined requirements, for example that the intensity of the energy beam is within a defined interval or meets a defined value. Therefore, it can be ensured that a correct amount of energy is depleted within the build material, which is crucial for process and object quality, as a deviation from the nominal energy that has to be depleted in the build material may negatively affect the consolidation process and therefore, may lead to imperfections in the object.

Further, it is known from prior art that two objects or a two parts of one object that are irradiated via different irradiation elements, i.e. different energy beams, may show different properties, such as mechanical behavior, as the at least one parameter of the different energy beams may differ. Thus, it is also necessary to determine and compare the at least one parameter of different energy beams. Usually, the determination is only performed via the determination unit that is provided with the individual apparatus, wherein imperfections in the determination unit, for example deviations in optical components of the determination unit, may lead to different determination results for different apparatuses or different energy beams, as different determination units are used to determine the at least one parameter. Thus, the calibration routine will result in different nominal values for the at least one parameter, as the at least one parameter of the different energy beams has been determined differently.

It is an object of the present invention to provide a method for calibrating at least one apparatus for additively manufacturing three-dimensional objects, in which the calibration of the determination unit and/or the irradiation device is improved, in particular wherein deviations in the calibration of different energy beams can be reduced or avoided.

The object is inventively achieved by a method according to claim 1. Advantageous embodiments of the invention are subject to the dependent claims.

The method described herein is a method for calibrating at least one apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is, as described before, adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that a calibration beam source is arranged or generated inside the process chamber of the apparatus, in particular in a build plane or a region above the build plane, wherein at least one parameter, in particular the intensity, of radiation emitted by the calibration beam source is determined via the determination unit and in that the irradiation device and/or the determination unit are calibrated dependent on the at least one determined parameter.

Thus, the at least one parameter of the at least one energy beam is not solely determined via the determination unit provided with the apparatus for additively manufacturing of three-dimensional objects, but a calibration beam source is arranged or generated inside the process chamber of the apparatus. The calibration beam source is adapted to generate radiation, in particular a calibration beam, such as an energy beam, for example a laser beam or an electron beam. Of course, the calibration beam source may be adapted to generate a plurality of calibration beams that may be emitted in the same or different directions. Generally, any type of radiation source can be used as calibration beam source, for example light emitting diodes, electron beam sources, laser sources, lamps, in particular (glowing) filaments, such as electric bulbs, or the like. The calibration beam source may further comprise various optical elements, such as masks, filters, pin holes, apertures, lenses and the like.

As described before, the calibration beam source is arranged or generated inside the process chamber in which the calibration beam source emits the at least one calibration beam to be determined via the determination unit of the apparatus. Hence, the determination unit is adapted to determine at least one parameter, in particular the spatial expansion of the calibration beam source, e.g. the size of the calibration beam source on a (camera) sensor and/or the intensity, e.g. the signal height of a photo diode, of the calibration beam source, i.e. of radiation emitted by the calibration beam source. Further, a focal position of the determination unit, e.g. a camera, may be adjusted. That can be performed by focusing on a defined pattern, e.g. a line pattern provided by the calibration beam source. The calibration beam source may for example be adapted (e.g. using suitable masks or apertures) to provide different spot sizes and/or different radiation patterns. Thus, it is possible to determine different parameters for different intensities or different spot sizes/irradiation patterns.

Dependent on the at least one determined parameter of the radiation emitted by the calibration beam source, a calibration of the apparatus for additively manufacturing three-dimensional objects is possible, in particular a calibration of the determination unit and/or the irradiation device can be performed. It is particularly possible, since the radiation pattern of the calibration beam source is known, to derive whether the determination unit determines the at least one parameter of the calibration beam source correctly or whether there is a deviation between the at least one parameter the determination unit determines and the (known) nominal value of the at least one parameter of the calibration beam emitted by the calibration beam source.

Preferably, it is possible to arrange the calibration beam source in different apparatuses for additively manufacturing three-dimensional objects to ensure that the determination units and/or the irradiation devices of different apparatuses can be calibrated identically, since the same radiation pattern generated by the same calibration beam source can be generated inside the process chambers of the different apparatuses. Therefore, deviations occurring in determination process performed by the individual determination units, for example due the status of optical components (impurities, deposits) or different optical components used in the different determination units or a maintenance state of the determination units, can be taken into calculation or can be compensated by performing the determination process based on the same calibration beam source with known radiation properties.

Thus, it is particularly preferred that the calibration beam source comprises a defined radiation pattern, wherein at least one part of the radiation that is emitted by the calibration beam source can be detected via the determination unit. Hence, it is not necessary to provide a separate determination unit, but it is possible to use the determination unit that is provided with the apparatus that is calibrated via the inventive method. Besides the fact that it is not necessary to provide a separate determination unit, the determination unit of the apparatus can be calibrated, as deviations between the at least one parameter that the determination unit determines and the nominal parameter that is known, can be used to calibrate the determination unit.

For example, a calibration beam source with a defined radiation pattern can be used, for example emitting a calibration beam with an intensity of 10W. If the intensity determined via the determination unit deviates from the (known) nominal intensity of 10W, a calibration of the determination unit is necessary. For example, if the determination unit determines an intensity of 5W, the determination unit can be calibrated accordingly to compensate the deviation. Self-evidently, various other parameters may be taken into calculation, as the determined parameter may depend on those various parameters, such as wavelength depended absorption or locally changing absorptions, for instance. Of course, the irradiation device can be calibrated the same way and/or the irradiation device can be controlled based on the determination performed via the determination unit or controlled based on the calibration of the determination unit, respectively.

According to another embodiment of the inventive method, a scan job in which the at least one parameter of the radiation emitted by calibration beam source is determined by scanning at least one region of the process chamber may be performed with the calibration beam source arranged in the at least one region of the process chamber, wherein the at least one parameter is determined for at least two positions in an x- and y-plane, in particular the build plane. Thus, according to this embodiment, scan jobs can be performed by scanning a region inside the process chamber, for example the build plane, which is arranged in an x- and y-plane. The x-direction or the y-direction may, for example, be arranged essentially perpendicular to a z-direction, which is parallel to the build direction, in which the object is additively built. It is further possible to scan only a defined part of the build plane or to scan the entire build plane. The term "scan" may refer to the determination of the at least one parameter for multiple positions in the x- and y-plane.

By determining the at least one parameter in multiple x- and y-positions it is possible to determine the at least one parameter more accurately or more reliably, since multiple determination results can be compared, in particular various operations can be performed on the determination result, such as determining averages, minima, maxima and the like.

Preferably, the at least one parameter may be determined for multiple positions in the x- and y-plane, in particular in at least one part of the build plane, wherein a map may be generated in which the determined parameter is spatially resolved. Hence, a map can be generated in which the at least one parameter of the radiation emitted via the calibration beam source can be spatially resolved. This allows for determining the variation of the at least one parameter over the x- and y-plane and, in particular to perform various operations on the determination results, such as generating averages, finding minima and/or maxima of the at least one parameter or fitting a function to the determined parameter(s).

Further, a maximum of the at least one parameter, in particular an intensity maximum, may be determined. Thus, a maximum determination procedure can be performed in which the maximum (or the minimum) of the at least one parameter of the radiation emitted by the calibration beam source can be determined. For example, if a map is generated in which the determined parameter is spatially resolved, for example in the x- and y-plane, the maximum of the at least one parameter can be determined and can be stored/saved. This embodiment allows for determining the maximum of the at least one parameter, for example the maximum of the intensity of the calibration beam that is determined via the determination unit. Therefore, a precise arrangement or positioning of the calibration beam source inside the process chamber is not crucial, as the x- and y-plane can be scanned and the maximum of the intensity can be determined. Thus, the calibration beam source can be arranged nearly arbitrarily inside the process chamber, as long as the calibration beam source is within the region of the x- and y-plane that is scanned during the scan job. Afterwards, the maximum of the at least one parameter can be determined and can be used for the calibration process.

Thus, it can be avoided that misalignments or errors in the positioning of the calibration beam source lead to different determination results and therefore, negatively affect different calibration data.

It is also possible to fit a function onto the determined parameter to determine the position of the calibration beam source. For example, if the determined parameter is overlaid by a noise signal, the mere determination of the maximum by determining the maximum of the parameter may not properly identify the position, e.g. the center, of the calibration beam source. Thus, fitting a function or using other characteristics of the parameter, e.g. a mean value of a certain area or using the median or the standard deviation or fitting a function to the determined data may identify the position of the calibration beam source more reliably.

Preferably, the determination unit and/or the irradiation device may be calibrated based on a deviation of the determined parameter from a nominal parameter of the calibration beam source. Hence, the nominal parameter of the calibration beam source is known, as the calibration beam source comprises a defined radiation pattern. For example, the intensity of the at least one calibration beam, i.e. the radiation emitted via the calibration beam source, is known and well-defined. As the at least one parameter of the radiation of the calibration beam source is determined via the determination unit of the apparatus the presence of a deviation between the determination result and the nominal parameter can be identified. Therefore, the determination unit and/or the irradiation device can be calibrated based on the deviations between the determined parameter and the nominal parameter. This ensures that every apparatus that is calibrated via the calibration beam source is calibrated the same way or, in other words, that the calibration is performed based on the same nominal parameter of the calibration beam source.

For example, a first apparatus may comprise a determination unit which derives a first determination result by determining the at least one parameter of the radiation emitted by the calibration beam source, an intensity of 5W for instance. A second apparatus may comprise a second determination unit which derives a second determination result by determining the at least one parameter of the radiation emitted by the calibration beam source, e.g. an intensity of 20W. For example, the at least one parameter of the radiation emitted by the calibration beam source is well known and is 10W, the first determination unit and the second determination unit can be calibrated accordingly, in that the deviations can be compensated. Hence, the energy beams of the first apparatus and the second apparatus can be controlled the same way, deploying the same amount of energy in the build material. Thus, two objects that are manufactured using the first apparatus and the second apparatus, comprise the same object quality, in particular the same object properties, as the same amount of energy is used for the consolidation process. Of course, it is also possible to calibrate the determination unit used for other purposes, such as determining the at least one parameter of radiation emitted from the build plane, e.g. thermal radiation emitted from the melt pool.

According to another embodiment of the inventive method, as a scan job a build job without using the energy beam may be performed or a scan job that is defined with respect to the calibration beam source, in particular the arrangement of the calibration beam source, may be performed. In the first alternative, a build job may be performed as scan job in which the energy beam that is regularly used to irradiate and consolidate the build material is not used or switched off, respectively. Thus, the determination unit of the apparatus can be used to scan the x- and y-plane, in particular the build plane, as in usual manufacturing processes. Instead of determining the at least one parameter of the energy beam as in regular manufacturing processes, the determination unit determines the at least one parameter of the radiation emitted by the calibration beam source. Advantageously, no other procedures are required to perform the calibration method as only the calibration beam source is to be arranged inside the process chamber and the energy beam has to be switched off or blanked, for instance.

Additionally or alternatively, it is also possible to use the energy beam of the apparatus (or another energy beam) to generate a calibration light source. Hence, the energy beam may be used to deplete energy in a material, which material functions as a calibration beam source and emits radiation that can be determined via the determination unit. If the quality and the properties of the material are known and defined parameters of the energy beam are met, the irradiated material (e.g. build material) can be used as calibration beam source. It is possible for the material to reflect the energy beam or to emit radiation, such as thermal radiation.

According to the second alternative, the scan job can be particularly adapted to the calibration process, in particular the scan job can be adapted to the arrangement of the calibration beam source. This allows, for example, that only a small part of the x- and y-plane has to be scanned, for example a part of the build plane in which the calibration beam source is to be arranged. Thus, the time required for scanning can be reduced, as not the complete x- and y-plane or build plane, respectively, has to be scanned, but the region may be restricted to the region in which the calibration beam source is arranged. Further, other characteristics of the calibration beam source can be taken into account, such as the wavelength of the radiation emitted by the calibration beam source. It is also possible to use at least two calibration beam sources emitting radiation with a defined properties, e.g. intensity, in particular the same intensity, but different wavelengths. Thus, the dependence of the determined parameter from a given (radiation) property can be identified.

Further, the calibration beam source may be arranged on at least one receiving unit with defined dimensions that can be arranged in the process chamber, e.g. in the build plane of the apparatus. The receiving unit may be a high precisely manufactured unit, such as a metal plate, with a receiving section in which the calibration beam source can be arranged. The receiving unit therefore, allows for positioning the calibration beam source accurate and repeatable. By using the receiving unit, the area in which the calibration beam source is arranged or generated inside the process chamber can further be decreased allowing for an even faster determination process, as the area in which the calibration beam source can be arranged and that has to be scanned for the calibration beam source to be detected properly, can further be reduced. Hence, the scan job may be performed dependent on the position of the calibration beam source on the receiving unit. The receiving unit therefore, defines the position of the calibration beam source in the x- and y-plane. Thus, a compromise between scan time and accuracy of detection of the calibration beam source can be performed.

Further, the receiving unit may comprise multiple receiving sections in which the calibration beam source can be arranged. It is also possible that multiple (different) calibration beam sources can be received in the multiple receiving sections provided by the receiving unit. Also, the receiving sections may be filled with a suitable material that can be irradiated with the energy beam to generate a calibration beam source, as described before.

According to another embodiment of the inventive method, the at least one parameter may be determined with the calibration beam source emitting radiation with different intensities and/or different wavelengths and/or spot sizes. Thus, it is possible to have the at least one calibration beam source emit radiation with different intensities, for example to enhance the quality of the calibration of the determination unit and/or the irradiation device by providing different intensities, as deviations of the determined parameter from the nominal parameter may differ with different intensities of the detected radiation.

Further, it is possible to have at least one calibration beam source that is adapted to emit different wavelengths, wherein the calibration process can further be enhanced, as the determination unit can comprise different deviations for different wavelengths. Additionally, it is possible that at least one calibration beam source is adapted to emit radiation from different spot sizes.

It is also possible to provide at least two, preferably different, calibration beam sources that may be used to emit radiation with different intensities and/or different wavelengths and/or spot sizes. For example, multiple light emitting diodes may be provided as calibration beam sources, wherein each calibration beam source may be used to emit radiation with a different intensity or a different wavelength. It is also possible to have multiple calibration beam sources that are adapted to emit different intensities, for example in one determination step each calibration beam source may be adapted to generate radiation with a first intensity and/or a first wavelength and in a second determination step each calibration beam source may be adapted to emit radiation with a second intensity and/or a second wavelength. Of course, an arbitrary combination of both approaches is feasible.

The inventive method can further be improved in that at least one energy beam parameter of at least one energy beam, in particular an energy output, of at least one irradiation element of the irradiation device, may be controlled dependent on the at least one determined parameter of radiation emitted via the at least one calibration beam source. Thus, the at least one energy beam that is generated via the irradiation device can be feedback controlled, as the determination unit can (instantly) determine at least one parameter of the at least one energy beam in the additive manufacturing process, for example the intensity of the energy beam or the energy output of the energy beam.

As the control of the at least one energy beam generated by the irradiation device may be performed dependent on the determination result of the determination unit, the control of the irradiation device can be performed based on the calibration that has been performed to calibrate the determination unit. It is also possible to calibrate the irradiation device directly, wherein a possible deviation between the determination result performed by the determination unit and the nominal parameter of radiation emitted by the calibration beam source can be considered by controlling the irradiation device, for example by using an offset value, or a multiplication factor or a lookup table that corrects control signals sent to the irradiation device. A lookup table may spatially relate the at least one parameter with the position in the x- and y-plane, such as a map.

According to another embodiment of the inventive method, the at least one parameter may be determined for at least two determination units and/or irradiation devices assigned to the same apparatus, in particular to the same build plane, and/or the at least one parameter may be determined for at least two determination units and/or irradiation devices assigned to different apparatuses. Thus, the calibration can be performed according to the inventive method for multiple determination units and/or multiple irradiation devices of the same apparatus to ensure that the at least one parameter of radiation inside the process chamber that is determined via the determination units delivers the same results. Further, the control of the irradiation devices can be calibrated accordingly to ensure that the energy beams generated via the irradiation devices deploy the same amount of energy in the build material. Thus, it is assured that all regions or sections of the object that is manufactured using the different energy beams receive the proper amount of energy and that deviations in the object compromising the object quality and/or the process quality can be reduced or avoided.

Further it is possible to ensure that two objects that are built in different apparatuses using different determination units and different irradiation devices comprise the same properties, in particular mechanical properties, as the determination units and/or irradiation devices that are assigned to the different apparatuses are calibrated using the same calibration beam source. Thus, both determination units and irradiation devices are calibrated based on the same parameter of the radiation emitted by the calibration beam source.

Besides, the invention relates to an apparatus for additively manufacturing of three-dimensional objects by means of successive layerwise selective irradiation and consolidation of layers of a build material which can be consolidated by means of an energy beam, wherein a determination unit is adapted to determine at least one parameter, in particular the intensity, of radiation emitted by a calibration beam source arranged or arrangeable or generated in a process chamber of the apparatus, wherein a control unit is adapted to calibrate an irradiation device and/or the determination unit dependent on the at least one parameter. The control unit may, inter alia, be considered as being part of the determination unit or the irradiation device. Of course, it is also possible to have a separate control unit or separate control units assigned to the apparatus.

Further, the invention relates to a determination unit for an apparatus for additively manufacturing of three-dimensional objects, in particular an inventive apparatus, as described before, which apparatus is adapted to generate an energy beam, wherein the determination unit is adapted to determine at least one parameter, in particular the intensity, of radiation emitted by a calibration beam source arranged or arrangeable or generated in a process chamber of the apparatus, wherein a control unit is adapted to calibrate an irradiation device and/or the determination unit dependent on the at least one parameter.

Self-evidently, all features, details and advantages described with respect to the inventive method are fully transferable to the inventive apparatus and the inventive determination unit. Preferably, the inventive apparatus is adapted to perform the inventive method, in particular using the inventive determination unit.

Figure 2:
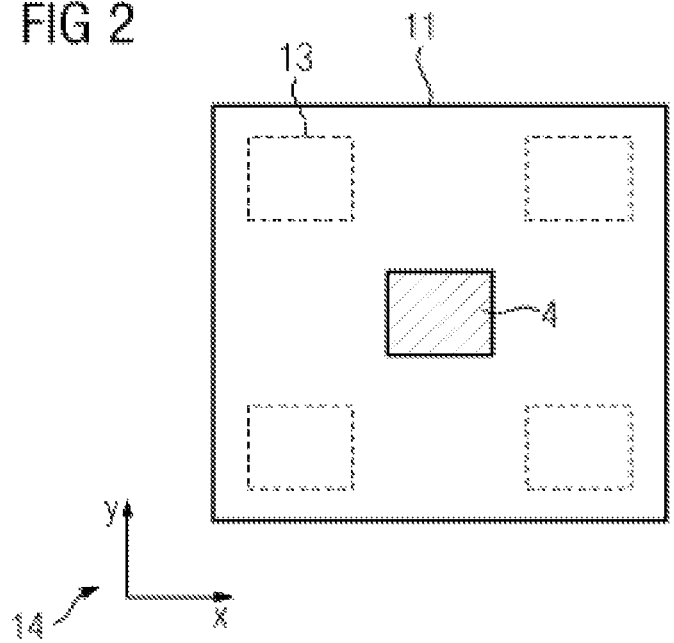

Exemplary embodiments of the invention are described with reference to the FIG. The FIG. are schematic diagrams, wherein FIG. 1 shows an inventive apparatus; and FIG. 2 shows a top view of a build plane of the inventive apparatus of FIG. 1.

FIG. 1 shows an apparatus 1 for additively manufacturing of three-dimensional objects by means of successive layerwise selective irradiation and consolidation of layers of a build material which can be consolidated by means of an energy beam. The apparatus 1 comprises a determination unit 2 that is adapted to determine at least one parameter, for example the intensity, of radiation 3 emitted by a calibration beam source 4. The calibration beam source 4 is arranged in a process chamber 5 of the apparatus 1, wherein the process chamber 5 encloses a volume in which the additive manufacturing process takes place in a regular operation of the apparatus 1.

The apparatus 1 further comprises a control unit 6 that is adapted to calibrate an irradiation device 7 and/or the determination unit 2 dependent on the at least one determined parameter. In this exemplary embodiment of the apparatus 1, the control unit 6 is used to calibrate the determination unit 2, as will be described below. The irradiation device 7 comprises at least one irradiation element (not shown), for example a laser source or an electron source, wherein the irradiation device 7 is adapted to generate and guide an energy beam 8 in a regular mode of operation of the apparatus 1. In other words, an energy beam 8 can be generated and guided in the build plane 9 in which usually build material is arranged to selectively irradiate and consolidate the build material to additively build the three-dimensional object. As the calibration method is performed, the energy beam 8 is not used, e.g. blanked or switched off (indicated via a dashed line). Although not shown, it is also possible to use the energy beam 8 to generate a calibration beam source by irradiating a defined material, such as build material, with the energy beam 8, wherein the material is preferably arranged in the build plane 9. The generated calibration beam source may emit radiation 3, just like the calibration beam source 4, as described before.

In other words, the calibration beam source 4 is arranged inside the process chamber 5, in particular in the build plane 9, which is positioned in the x- and y-plane. The calibration beam source 4 is adapted to emit radiation 3, for example a calibration beam, such as a laser beam, an electron beam or (visible) light with a defined radiation pattern, in particular a defined intensity. In this exemplary embodiment, radiation 3 which is emitted by the calibration beam source 4 propagates towards the irradiation device 7, in particular to a beam guiding unit, such as a x- and y-scanner (not shown). The beam guiding unit is used to guide the energy beam in the build plane 9 in a regular mode of operation of the apparatus 1. The radiation 3 therefore, can be guided via the beam guiding unit of the irradiation device 7 towards the determination unit 2, wherein the x- and y-plane, in particular the build plane 9, can be scanned due to the movement of the beam guiding unit as indicated via lines 10. Thus, radiation 3 that is emitted via the calibration beam source 4 can be detected via the determination unit 2 and the at least one parameter of the radiation 3 can be determined via the determination unit 2.

In the exemplary embodiment depicted in FIG. 1, 2 the calibration beam source 4 is received within a receiving unit 11 (optional) that is carried on a carrying element 12 of the apparatus 1. The carrying element 12 carries a volume of build material in the regular mode of operation of the apparatus 1, for example carrying a powder bed in which the object is additively built by selective irradiation and consolidation. The receiving unit 11 is preferably a high position precision manufactured element, for example a metal plate with a recess for the calibration beam source 4. As described before, it is also possible to irradiate at least one part of the receiving unit via the at least one energy beam.

As indicated in FIG. 2, which shows a top view onto the calibration beam source 4 and the receiving unit 11, additional calibration beam sources 4 can be provided in recesses 13 (indicated via dashed lines). Thus, it is possible that multiple calibration beam sources 4 can be arranged in different positions in the x- and y-plane (indicated via arrow 14). Each calibration beam source 4 can be provided for emitting radiation with a specific wavelength and a specific intensity or at least one calibration beam source 4 can be provided that is adapted to emit radiation with adjustable wavelength and/or adjustable intensity.

The determination unit 2 may in particular determine the at least one parameter of the radiation 3 emitted via the calibration beam source 4 in multiple positions in the x- and y-plane and further generate a map in which the determined parameter is spatially resolved. In other words, for any point or position in the x- and y-plane a value of the determined parameter can be stored. In particular, it is possible to perform operations on the determined parameter, such as finding a minimum value or a maximum volume, respectively. Thus, a maximum determination procedure can be performed in which the determination unit 2 determines the maximum value of the parameter of the radiation 3 that is emitted via the calibration beam source 4 in the x- and y-plane.

The maximum value of the parameter, for example the maximum intensity, can be used for the calibration process. Thus, the maximum determination procedure allows for a positioning the calibration beam source 4 in an arbitrary position in the build plane 9 (the x- and y-plane), wherein exact position of the calibration beam source 4 is identified over the maximum of the at least one parameter derived in the maximum determination procedure. Hence, the position with the highest intensity in the x- and y-plane can be identified as the position of the calibration beam source 4. Thus, a highly accurate positioning of the calibration beam source 4 is not necessary. However, by having a receiving unit 11 that is highly precise manufactured, the area in which the determination unit 2 determines the at least one parameter (scans the build plane 9) can be reduced significantly.

After the at least one parameter of the radiation 3 emitted via the calibration beam source 4 has been determined, the determined parameter can be compared with the (known) nominal value of the parameter, as the calibration beam source 4 comprises a well-defined radiation pattern, for example a well-defined intensity. Deviations between the determined parameter and the known parameter can be taken as basis for the calibration, as the deviations from the defined parameter indicate whether the determination unit 2 is properly calibrated.

For example, if a calibration beam source 4 is used that emits radiation 3 with an intensity of 10W and the determination unit 2 determines an intensity of 20W, the values determined via the determination unit 2 have to be adjusted (calibrated) accordingly. The determination can in particular be performed for different wavelengths or different intensities as the determination unit 2 may require different calibrations for different intensities and/or wavelengths.

In other words, to calibrate the apparatus 1, the calibration beam source 4 is inserted into the process chamber 5, in particular in the build plane 9, preferably using the receiving unit 11. Thus, radiation 3 emitted via the calibration beam source 4 can be detected with the determination unit 2, wherein at least one parameter of the radiation 3 can be determined. Afterwards, the determined parameter can be compared with a nominal parameter to determine whether a deviation between the determined parameter and the nominal parameter is present. Based on the data acquired, calibration data can be generated by the determination unit 2. Of course, it is also possible to calibrate the irradiation device 7 by using the generated calibration data to take the deviations in the determination process performed by the determination unit 2 into calculation for generating the at least one energy beam 8.

Of course, if more than one determination unit 2 is present or different objects are to be manufactured with different energy beams 8, e.g. in different apparatuses 1 or in the same apparatus 1, the determination and, in particular, the calibration process, can be performed for each determination unit 2 or each irradiation device 7.

Self-evidently, the inventive method can be performed on the apparatus 1. The calibration method can, for example, be performed with different properties, such as intensities, wavelengths or sizes of the calibration beam source 4. Thus, different calibration data may be generated for different properties of the calibration beam source 4.

The invention claimed is:

1. A method for calibrating at least one apparatus for additively manufacturing three-dimensional objects via selective irradiation of a build material by an energy beam from an irradiation device, the method comprising:
   generating radiation by a calibration beam source, wherein the calibration beam source is arranged in a build plane of the at least one apparatus;
   determining, by a determination unit, at least one parameter of the radiation inside a process chamber from the calibration beam source, wherein the at least one parameter comprises an intensity of the radiation from the calibration beam source; and
   calibrating the irradiation device dependent on the at least one parameter,
      wherein the calibration beam source is arranged in a receiving unit in the build plane of the at least one apparatus, and
      wherein the receiving unit is carried on a carrying element of the at least one apparatus.

2. The method of claim 1, wherein the radiation from the calibration beam source comprises a defined radiation pattern.

3. The method of claim 1, further comprising scanning a region of the process chamber comprising radiation from the calibration beam source, wherein the at least one parameter is determined for at least one or more positions in an x- and y-plane.

4. The method of claim 3, wherein the x- and y-plane comprises the build plane of the at least one apparatus.

5. The method of claim 3, further comprising generating a map comprising the at least one or more positions.

6. The method of claim 1, wherein the at least one parameter comprises a maximum intensity.

7. The method of claim 1, wherein calibrating the irradiation device dependent on the at least one parameter comprises calibrating based on a deviation of the at least one parameter from a nominal parameter.

8. The method of claim 1, wherein determining the at least one parameter at least partially occurs when the energy beam is not irradiating the build material.

9. The method of claim 1, further comprising scanning a region of the process chamber dependent on a position of the calibration beam source in the receiving unit.

10. The method of claim 1, wherein generating radiation by the calibration beam source comprises generating radiation of different intensities, wavelengths and/or spot sizes.

11. The method of claim 1, wherein generating radiation by the calibration beam source comprises generating radiation by at least two calibration beam sources.

12. The method of claim 11, wherein the radiation respectively emitted from the at least two calibration beam sources have different intensities, wavelengths and/or spot sizes.

13. The method of claim 1, wherein determining, by the determination unit, the at least one parameter of the radiation inside the process chamber from the calibration beam source comprises at least two determination units for the at least one apparatus determining the at least one parameter.

\* \* \* \* \*